United States Patent [19]

Duffy

[11] Patent Number: 4,871,284

[45] Date of Patent: Oct. 3, 1989

[54] HYDRAULIC TRANSPORTATION

[75] Inventor: Geoffrey G. Duffy, Auckland, New Zealand

[73] Assignee: Fibre Dynamics Limited, New Zealand

[21] Appl. No.: 107,941

[22] Filed: Oct. 13, 1987

Related U.S. Application Data

[63] Continuation-in-part of Ser. No. 791,230, Oct. 25, 1985, abandoned, which is a continuation-in-part of Ser. No. 545,347, Oct. 25, 1983, Pat. No. 4,605,329.

[30] Foreign Application Priority Data

Oct. 29, 1982 [NZ] New Zealand .................. 202329

[51] Int. Cl.⁴ ............................................. B65G 53/30
[52] U.S. Cl. ..................................... 406/49; 406/197; 137/13
[58] Field of Search ..................................... 406/45–49, 406/86, 184, 190, 191, 193, 197, 198; 137/13

[56] References Cited

U.S. PATENT DOCUMENTS

| | | | |
|---|---|---|---|
| 3,268,263 | 8/1966 | Van Olphen | 406/49 |
| 3,448,944 | 6/1969 | Shellene et al. | 406/191 X |
| 4,000,927 | 1/1977 | Sakamoto et al. | 406/120 X |
| 4,440,543 | 4/1984 | Echtler | 406/45 X |

FOREIGN PATENT DOCUMENTS

| | | | |
|---|---|---|---|
| 2514420 | 10/1976 | Fed. Rep. of Germany | 137/13 |
| 7002123 | 8/1970 | Netherlands | 406/46 |

*Primary Examiner*—Sherman D. Basinger
*Assistant Examiner*—Stephen P. Avila
*Attorney, Agent, or Firm*—Connolly and Hutz

[57] ABSTRACT

Large or small articles are hydraulically transported through a pipeline with the help of fibers that flocculate in the hydraulic liquid to form flocs and networks of flocs which cushion the articles against engagement with the wall of the pipeline pipe. The articles can be packed in capsules and the capsules provided with vanes to improve cushioning. Cushioning can also be improved by introducing stranded lattices into the fiber-floc-containing liquid to thus increase the flocculating action.

2 Claims, 5 Drawing Sheets

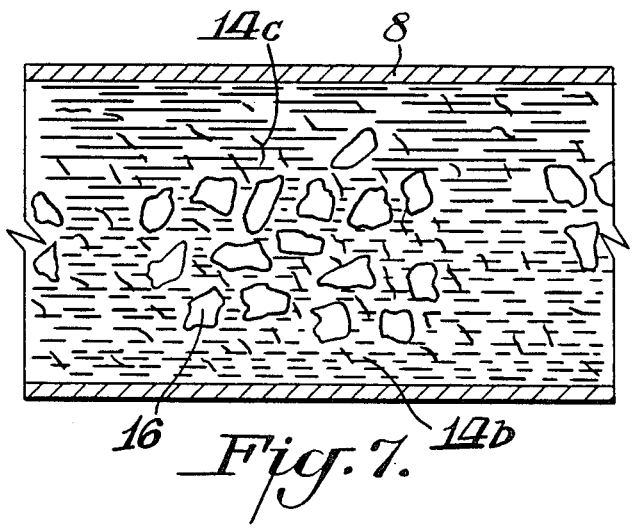 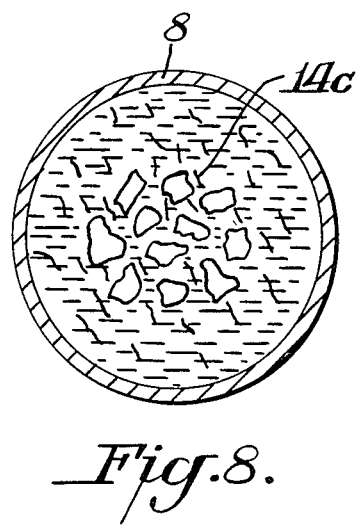
Fig. 7. Fig. 8.
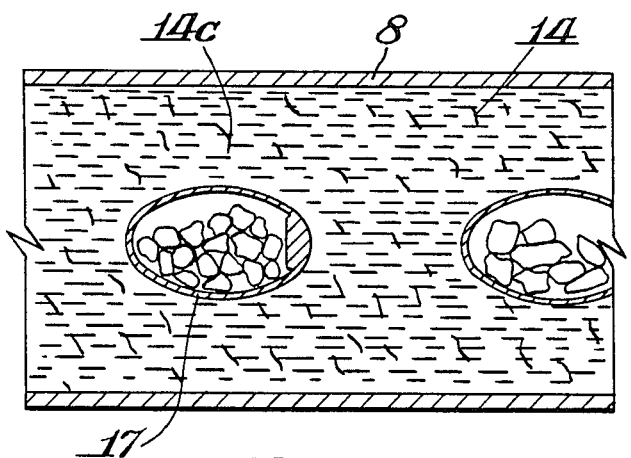 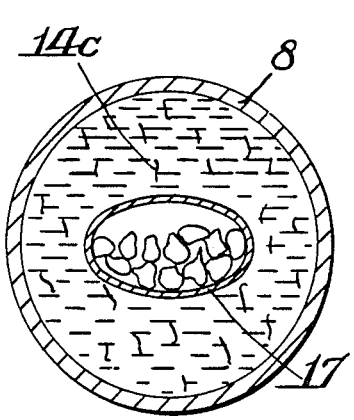
Fig. 9. Fig. 10.
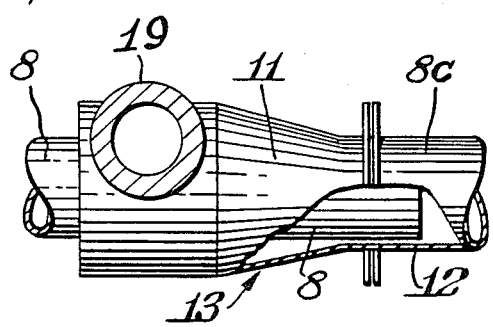
Fig. 12.

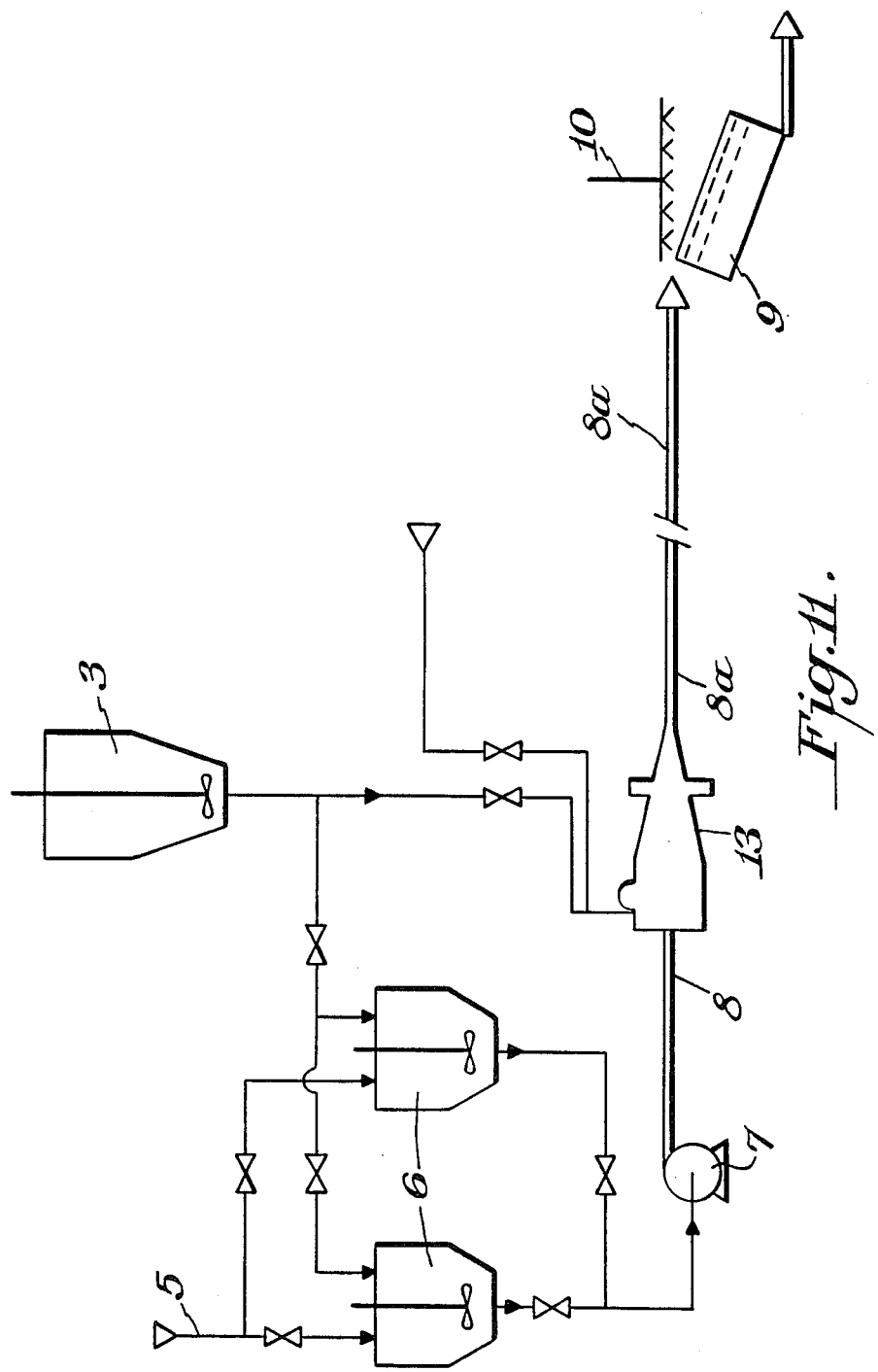

HYDRAULIC TRANSPORTATION

This application is a continuation-in-part of earlier application Ser. No. 791,230 filed Oct. 25, 1985 (subsequently abandoned) which in turn is a continuation-in-part of still earlier application Ser. No. 545,347 filed Oct. 25, 1983 (U.S. Pat. No. 4,605,329 granted Aug. 12, 1986).

The present invention relates to the hydraulic transporting of objects including those having a specific gravity greater than, equal to, or less than one. It is particularly suitable for hydraulically transporting objects in the form of particulate material. The invention is primarily concerned with utilizing water as a transporting medium; however, other liquids may be utilized.

It is already known to hydraulically transport particulate material having a specific gravity greater than one. As a matter of convenience and cost, water is normally utilized as the transporting liquid where practical. The material and the transporting liquid are combined to form a slurry which is then pumped or otherwise caused to travel along a pipe, conduit or similar supporting structure. There are considerable limitations in attempting to transport particulate material in this manner.

A first requirement for the foregoing is to finely crush the material to provide a particulate material comprised of minute particles to achieve a "pumpable" and otherwise flowable slurry. The finer the particles, the greater is the crushing required and thus the less cost-effective the method. Further, the finer the particle size, the more difficult it is to de-water the particles at their destination. Thus, the transporting of particulate material as a slurry often requires extensive supplementary apparatus and processing both upstream and downstream of the system.

A further disadvantage in utilizing a slurry technique is the essentially abrasive nature of slurries. Thus, the particle population of the medium must be limited otherwise the friction becomes too high, rendering the slurry unpumpable or uneconomic for pumping. The friction also manifests itself in the form of abrasive wear on the supporting structure increasing the need for maintenance and replacement. This abrasive nature of a slurry also provides a further disincentive to attempt to pump larger particles as the attrition factor between particles can become self-defeating as it tends to reduce the particle size.

A further problem in pumping a slurry is the settling-out of the particles. Settling tends to occur upon reduction in the rate of flow, sedimentation sometimes resulting in zero flow. Thus a prime mover, conventionally a pump, needs to have a capability of maintaining a substantial rate of flow which will avoid this problem. Should the prime mover fail and the flow stop, the settling of particles can create a deposit which may not clear with reinstatement of pumping or even reinstatement of the liquid flow. This is a substantial problem with known slurry pipelines and to avoid stand-down time to clear such a blockage, auxiliary pumps are normally utilized. This problem and the additional cost in attempting to circumvent it also detracts from utilizing a slurry approach in the transporting of particulate material.

The aforesaid problems increase with the distance over which transportation is required. This has also tended to limit the utilization of hydraulic transportation for the carrying of particulate material over extensive distances. For example, very substantial quantities of detritus material such as coal and metal ores often must be transported a considerable distance from their point of extraction. For a variety of reasons, conventional transporting means such as railways and road haulage, are becoming less desirable. The provision by this invention of a suitable hydraulic transporting method and apparatus provides a realistic alternative for the passage of such materials over extensive distances.

It has been proposed in U.S. Pat. No. 3,268,263 granted Aug. 23, 1966 to incorporate fibers in the foregoing slurries, but no one appears to have adopted such proposal in a commercial installation.

It is an object of the present invention to provide novel methods and equipment for hydraulically transporting objects such as large objects or particulate material or mixtures of materials in particulate form.

It is a further object of the present invention to provide a method and apparatus for hydraulically transporting a quantity of particulate material which will go at least some way towards minimizing the disadvantages and limitations discussed above with respect to the pumping of slurries.

Additional objects will be shown in the following description.

The present invention provides improved methods of hydraulically transporting objects by the controlled supporting of the objects with the help of a quantity of a supportive material within the transporting liquid.

According to one preferred aspect, this invention provides a method of hydraulically transporting an object through a conduit with the help of a layer of fiber-liquid cushioning network injected around the object to form a fluid stream barrier or cushion between the conduit and the object.

Additional aspects of the present invention relate to the hydraulic transportation of objects that are relatively large such as re-usable capsules and elongated materials such as tree logs, metal or plastic rods, and the like.

Embodiments of the present inventions will now be more particularly described by way of example with reference to the accompanying drawings in which:

FIGS. 3, 5, 7 and 9 are similar views to FIG. 1 depicting modified forms of the invention;

FIGS. 4, 6, 8 and 10 are cross-sectional views of FIGS. 3, 5, 7 and 9, respectively;

Figure 13:
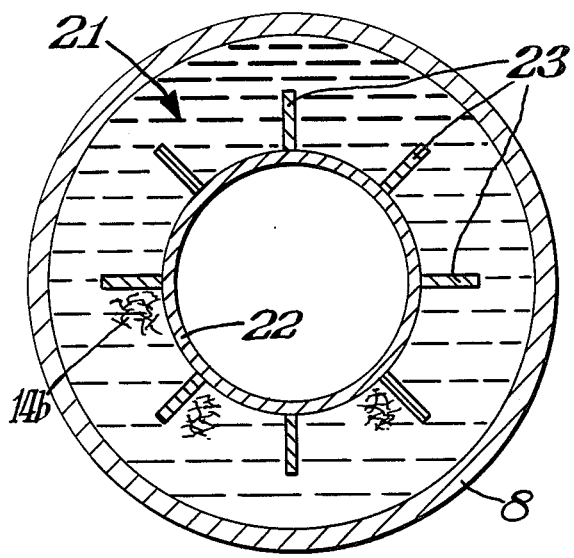
Figure 14:
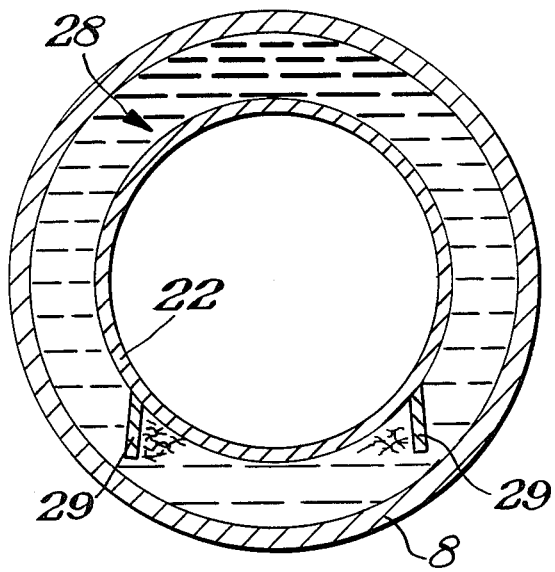
Figure 15:
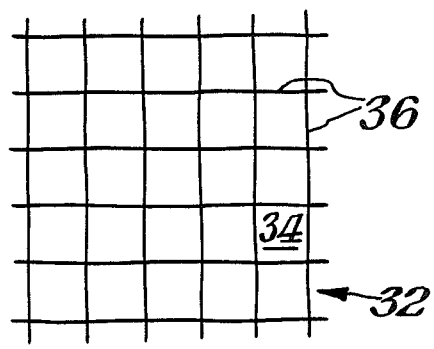
Figure 16:
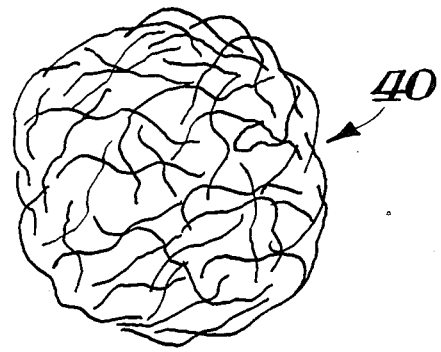
Figure 17:
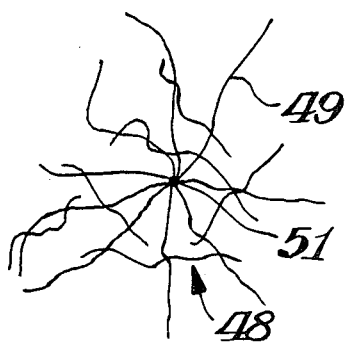
Figure 18:
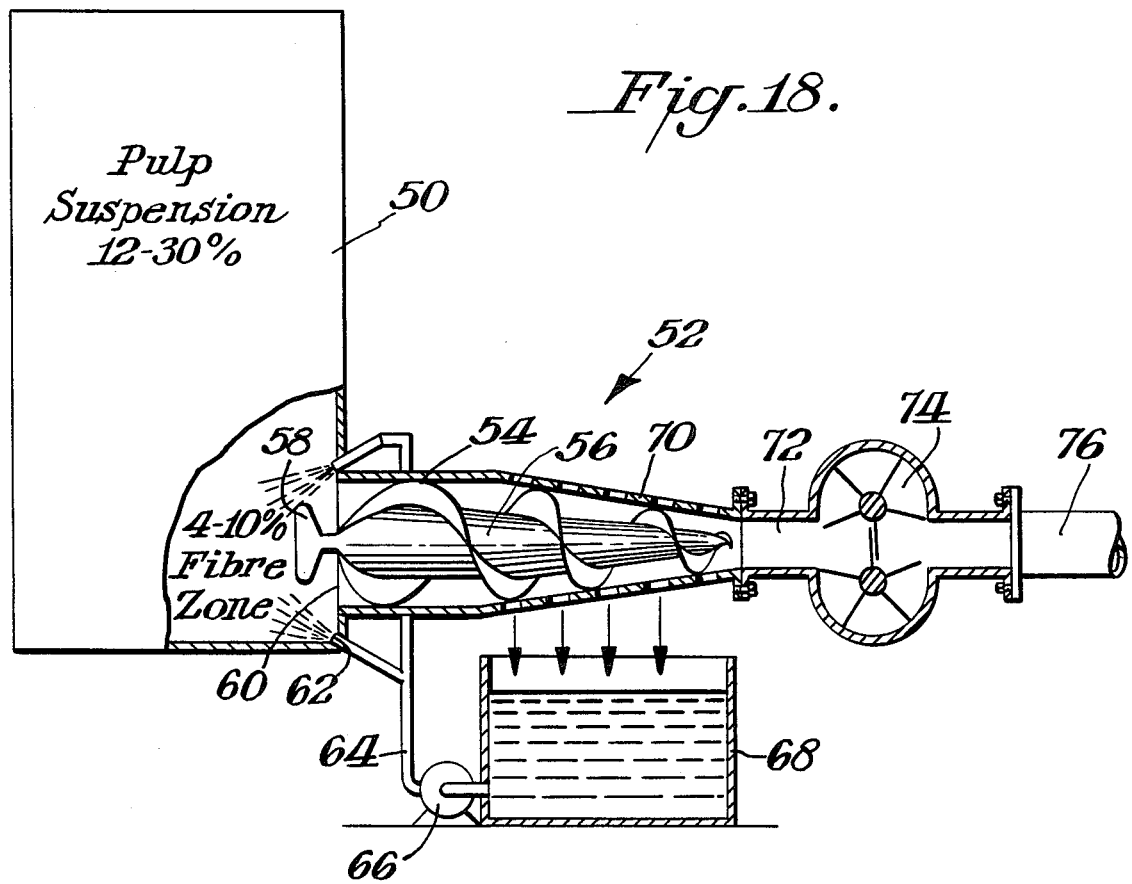

FIG. 11 diagrammatically illustrates an installation for transporting particulate material in accordance with this invention;

FIG. 12 is a schematic partly sectional side elevation of an injection device for inserting a barrier layer;

FIGS. 13 and 14 are transverse sectional views similar to that of FIG. 10 illustrating modifications of the capsule structure shown there;

FIG. 15 illustrates one embodiment of an engagement lattice in accordance with the present invention; and FIGS. 16 and 17 illustrate other embodiments of engagement lattice pursuant to the present invention; and FIG. 18 is a side view partly in section of a fiber pulp pumping system in accordance with the present invention.

The pumping of wood pulp fibers through pipes is a well-established process. Considerable study has been made in that field to achieve better designed and more efficient pumping and pipeline installations. The reader is directed to that field of technology and in particular to the various issues of "Tappi", being The Journal of the Technical Association of the Pulp and Paper Industry, and publications of the Swedish paper industry periodical "Svensk Papperstidning" for supportive information useful in understanding the present invention. Some aspects of the present invention relate to the use of capsules in hydraulic pipelines, as described for example in the Ellis et al paper in The Canadian Journal of Chemical Engineering, Vol. 52, August 1974, pp. 457–462.

One of the properties of suspensions of paper pulp fibers is their tendency to flocculate and form three-dimensional fiber networks or flocs that fill the entire container in which the suspension is held. At concentrations corresponding to those normally encountered in paper making, there is insufficient free volume for the fibers to move in a shear field without collision. Because of the flexible and elastic nature of the fibers, collisions produce small bundles of entangled fibers to which other fibers adhere. Fiber aggregates grow by further collisions and flocs are formed. When agitation is reduced in intensity or ceases, the flocs interlock to form coherent fiber networks that can fill a vessel or pipe. The flocs so developed by mechanical entanglement form localized variations of fiber concentration in the entire fiber network.

The coherent nature of fibre networks is not attributed to either chemical bonding or the effect of surface tension forces, since networks developed from different synthetic fibers have been observed to produce comparable network properties. The coherence of fiber networks is due to internal stresses set up in the network, primarily by normal forces associated with stresses in the fiber, and the additional frictional resistance at the active points of fiber contact. A fiber-liquid network possesses supportive or cushioning properties similar to those possessed by solids.

Figure 1:
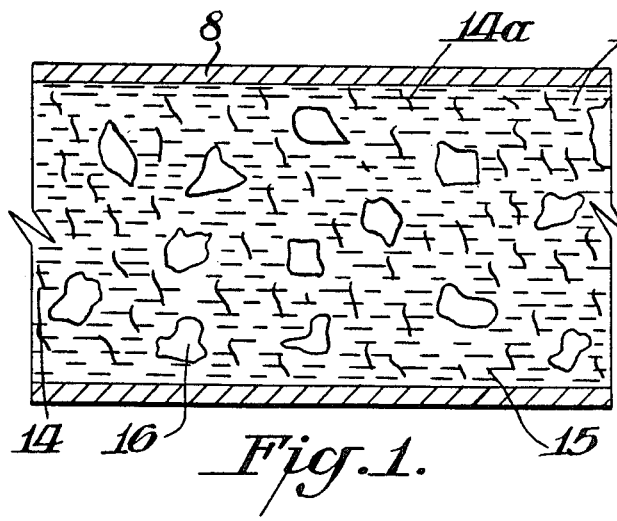
FIG. 1 is a schematic longitudinal sectional view of a portion of a pipeline with a fiber-liquid network supporting particulate material as a continuous stream therein.
Figure 2:
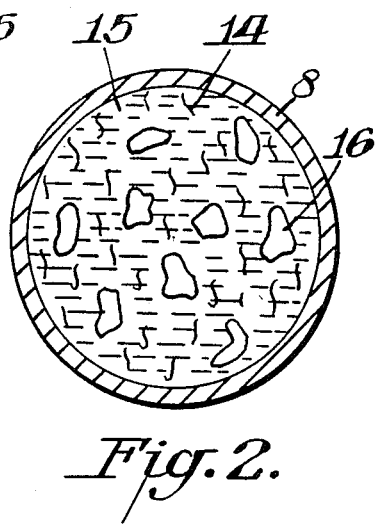
FIG. 2 is a cross-sectional view of the arrangement depicted in FIG. 1.

Referring to FIGS. 1 and 2 of the drawings, the supportive material of the present invention preferably consists of fiber networks 14 of wood pulp fibers 14a suspended in water 15. However, various other types of fiber can be substituted, including synthetic filaments. The specific gravity of the fibers are preferably about 1 or less and can also be substantially grater than one. The fiber type and concentration may be chosen depending on the type of objects 16, and the quantity to be transported. Further, a fiber network can be created by utilizing a mix of different types of fiber, and other liquids including gels and polymers will be suitable as the liquid medium.

A disruptive supportive shear value for a fiber network 14 can be chosen so as to be greater than the resultant downward or upward force of an object or objects 16 within that network. By this means objects 16, even if relatively large in size, can be trapped within a fiber-liquid network 14 and can thus be maintained in a stable suspension and a pumpable state, rendering it possible for the hydraulic transportation of objects 16 while supported or cushioned by such a fiber-liquid network 14. The particulate solids in such a stable suspension and pumpable state can be maintained for extensive periods, even when flow is halted.

At low flow rates the fiber network 14 carrying the objects, flows as if it were a continuous plug, and the main, if not all, the flow shear occurs at the interface between the fiber network 14 and the wall of the supporting structure 8, conventionally a pipe or open conduit. Consequently, objects 16 trapped wholly inside or on the fiber network 14 as to be spaced from the walls of the supporting structure 8, will not unduly affect the friction loss and resulting pressure drop, as compared to the friction loss and pressure drop of a fiber network 14 flowing alone. At higher flow rates, a thin turbulent fiber-water annulus can develop, and if so the friction loss may become lower than that of water alone, due to the drag reduction effect of fibers in turbulent motion within the annulus.

Figure 3:
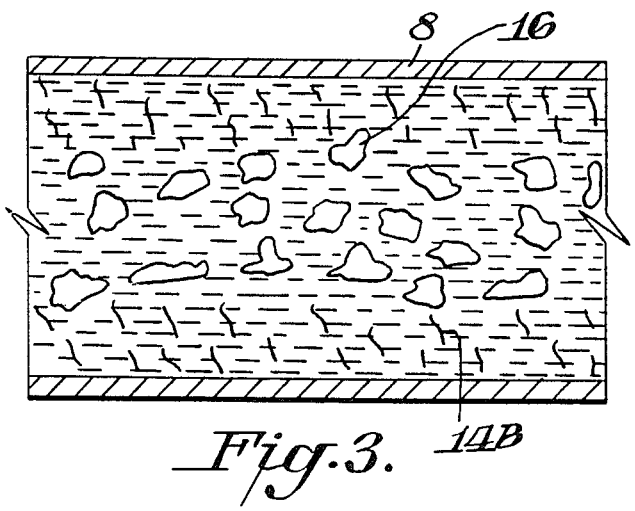
Figure 4:
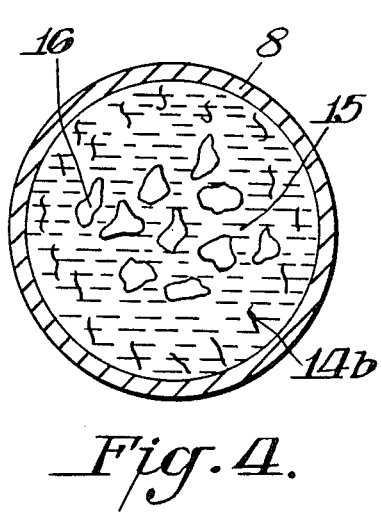

FIGS. 3 and 4 show a modified form of the foregoing combination wherein an annular fiber-liquid network layer 14b is provided as a support or additional barrier between the core and the walls of the supporting structure 8. The annular layer can support large or dense particles or large objects such as tree logs or long metal rods. That layer can also support capsules containing solids, gases or liquids. The contents of the capsules may be controlled or varied at will, thereby providing a totally flexible transport system.

Without the additional barrier, some of the transported articles can come into contact with wall 8 and increase the flow friction, abrasion, attrition or particle breakdown.

Figure 5:
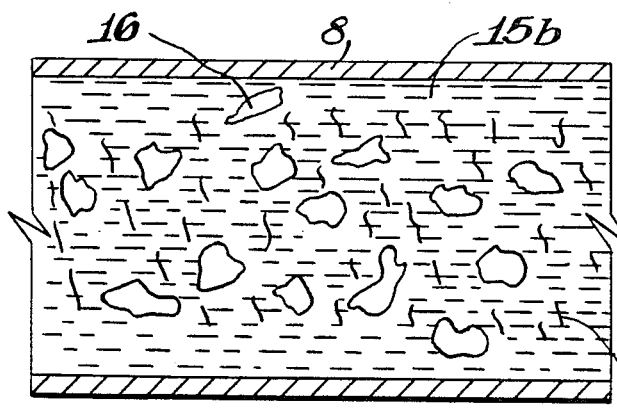
Figure 6:
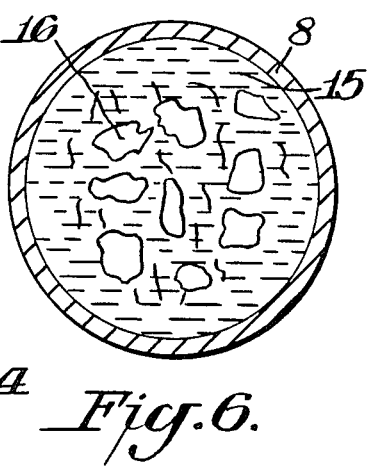

FIGS. 5 and 6 show a modification in which the additional annular barrier is fiber-free liquid 15b. This arrangement is helpful when the fiber concentration in the core is high, for example, 8% or more by weight of the water, and is suitable for transportation distances that are relatively short, e.g. 3 km or less.

When the population of objects 16 mixed into the fiber-floc network 14 is high, the objects 16 can displace the fiber material 14 in sufficient quantity as to reduce the degree of interlocking continuum in the fiber network 14. However, in this situation some fiber flocs 14c do become trapped about and between the objects. This is shown in FIGS. 7 and 8, where there is also provided the annular fiber cushioning layer 14b. The flocs 14c reduce the interaction between objects 16 with the result that particle attrition is reduced. For example, this approach could be adopted where transportation over considerable distances is concerned and/or the nature of the particulate material 16 involved is such that settling out and attrition could be significant problems.

Many different types of objects 16, including those in the form of particulate material, can be transported in accordance with this invention. The invention may be applied to types of coal, gravel, sintered solids, wood chips, mineral ores and a mixture of any one or more of these. As regards mixtures of particulate material 16 it is envisaged, for example, that suitably particulated refuse comprised of a variety of debris material could be transported in accordance with this invention. Further, referring to FIGS. 9 and 10, containers such as re-usable plugs, capsules or cylinders 17 of flexible or rigid material could similarly be transported by the fiber-liquid network 14 in accordance with the present invention, that is in the transportation of objects or liquids in capsules as herein defined.

The ratio of objects 16 to fiber network 14 concentration and nature of the suspension medium 15, are interdependent and this may call for a degree of trial and experiment in applying the invention to any specific task. The important design parameters are the choice of suspension medium 15, supportive material and concentration thereof within that medium, the mode of flow as well as the properties of the object 16 to be transported such as size, shape, density and concentration within the fiber network 14. Supporting structures for the liquid can be open or closed ducting such as depicted in a pipe 8, or channels formed from conventional materials, for example, metal or concrete. In extreme situations such as if particularly abrasive material 16 is to be transported, an additional fluid barrier can be utilized as described in more detail herein. As alternative liquids for forming fiber flocs, there can be used methanol, ethanol, gasoline, liquid or liquifiable hydrocarbons, liquid carbon dioxide, and even sea water.

Following are details of tests I have performed in respect of the invention. The test equipment involved a PVC pipe having an internal diameter of 150 mm, the pipe extending a distance of approximately 100 meters. The outlet of the pipe was disposed higher than the inlet to provide a "head" of about 5 meters. A conventional centrifugal open-impeller pump driven by a prime mover powered at 35 kilowatts was utilized together with water as the medium in which a variety of wood fibers were suspended to form a variety of supportive fiber-liquid networks.

In a first series, coal of particulate sizes between 3 mm and 20 mm was inserted into a fibre-liquid network created from long kraft wood fibers at 1.35% mass concentration within a water medium. The mass concentration of the coal particles, ranged up to 33.5%. The flow velocities of the resultant charged fiber-liquid network ranged from 0.6 to 4.1 meters per second. At levels of coal concentration less than 14%, the friction loss was less than that accounted for by water alone, in the range of 2.5 to 3.2 meters per second. At 3.0 meters per second and 33.5% coal concentration, pipe friction was recorded at about double that of water at the same flow rate.

In all cases covered by the above series of experiments the fiber-liquid network was stopped to simulate a breakdown and enable particle settling to be studied. This is called a "static test". The particles did not settle out, and pumping with resultant hydraulic transportation of the particulate material was readily and successfully re-started after a stop period of eight days.

In another series of tests, coal particles up to 12 mm in size were hydraulically transported successfully at mass concentrations up to 43.4% with mechanical pulp fiber. Re-starting was readily and successfully achieved after a "static test" period of six weeks.

In yet another series, coal particles ranging from 4 mm to 60 mm at up to 33% mass concentration were successfully transported with friction loss levels approximately double those of water at the same flow rate. Kraft fiber at approximately 1.5% mass concentration was utilized at flow rates between 2-4 meters per second. Static tests were carried out for two- and six-day periods with success.

In a further series, natural stones sized between 3-10 mm and having a range of specific gravity between 2.0 and 2.8 were hydraulically transported at 13.5% mass concentration in a fiber network of 2.5% mechanical pulp fiber suspended in water. Static tests were carried out successfully for periods of up to fourteen days.

The foregoing tests were conducted in the manner described in connection with FIG. 1 and 2.

Tree logs prepared by transversely cutting tree trunks that were about 10 centimeters in diameter, into lengths of about 50 centimeters, have also been successfully transported with a 1.0% suspension of Kraft fibers in water, with friction losses below that of water, and these passed settling tests extending as long as several weeks.

Rods of metals such as steel or aluminum can also be transported the same way, but it is preferred to have higher fiber concentrations when the hydraulically transported articles have higher specific gravities. About 3.2% fiber works very well with aluminum at low friction loss, and about 5.5% fiber concentration similarly works well with steel.

The log transportation was effected with all the fibers in an annular cushioning layer as described above. The rod transport can be similarly accomplished, but where the rods are transported as bundles, fiber flocs can also be introduced between the individual rods. The rods can be of any thickness, down to even 0.5 mm, and iron sand, crushed coal and wood chips have been successfully transported as a central core surrounded by the annular cushioning layer of the present invention, as in FIGS. 3 and 4. Fiber flocs can also be introduced into such cores of particulates, as shown in FIGS. 7 and 8.

The material to be hydraulically transported can be packed into capsules as noted above and shown in FIGS. 9 and 10. In such arrangement very low friction head losses are experienced with fiber floc suspensions having fiber concentrations as low as 1%. Such capsules are preferably made of smooth-surfaced plastic such as polyvinyl chloride and can have wall thicknessses as litle as 0.05 millimeter, or as large as 1 to 2 millimeters in the event objects such as iron rods are packed into them. Rigid-walled capsules are somewhat easier to work with, but flexible-walled capsules are preferred where the specific gravity of the capsule is to be adjusted as by controlling the volume of air space remaining when the capsule is filled. The ends of the capsule can be sealed in any of the manners described in the Liu et al paper "Design and Construction of a Major Hydraulic Capsule Pipeline Test Facility in Missouri: Status Report", presented Oct. 16, 1985 at the Fifth International Symposium on Freight Pipelines at the Hilton Hotel, Philadelphia, Pa.

The capsules 17 of the present invention can also be made of metal such as aluminum, as by extruding the metal with the desired cross-sectional configuration and in long lengths, and then cutting those lengths to shorter lengths from about 0.5 meter to as much as 3 or 4 meters or more. Plastic capsules can be similarly prepared, and their open ends closed as by expanding rubber or plastic plugs as shown by Liu et al. Normally cylindrical capsules are preferred and are most readily fitted with closures. However, they can be oval, as in FIG. 10, or rectangular or polygonal in cross-section. Spherical capsules can also be used. Capsules that are not circular in transverse section are best sealed by welding. Thus, plastic capsules can very simply have their ends clamped between heat-sealing bars. No wheels or wrapping materials are used.

FIG. 11 diagrammatically depicts a hydraulic pipeline installation that can be used in accordance with the present invention. A liquid supply 5 preferably of water 15, is fed to a bank of batching tanks 6 into which there are deposited quantities of particulate material 16 to be transported. Fiber, preferably suitable wood fibers sourced from a reservoir 3, are also fed to the batching tanks 6. The batching tanks 6 enable control over the mix of the particulate material 16 with the fiber-liquid network 14, and feed it to a slurry type pump 7 which in turn feeds the pipeline 8. At its outlet 8a the pipeline discharges onto a de-watering device 9 to separate at least the water 15 of the fiber-liquid network 14, from the outfall. A shower 10 can be utilized to facilitate the screening and/or extend the separation of the wood fiber 14 from the particulate material 16.

An injector 13 as depicted in FIG. 12 is utilized to create a liquid annular layer 15b or fiber-liquid network layer 14b, to provide an additional barrier between the supporting structure 8 and the particulate material 16. The injector 13 comprises a housing 11 of a generally frusto-conical configuration disposed concentrically about the transporting pipe 8. A tangentially disposed inlet 19 is provided in housing 11 at an upstream and larger diameter end thereof, through which inlet the material of the additional layer can be charged. At the downstream end the housing 11 forms an annular-shaped outlet port 12 about the pipe 8, the port 12 and the interior of the pipe 8 conjoining in that relationship and forming a continuation 8c of the pipe 8.

Liquid 15 with the fiber network 14 created therein can be pumped through the inlet of the injector 13 to become injected into the pipe 8a in a substantially helical flow pattern to thus form the annular layer 14b between the pipe contents and the wall of the pipe 8a. This layer modification is appropriate to consider with particle concentrations above approximately 20% by mass.

Particles to be transported can be of various sizes and can be at high concentrations ranging up to 100% solids, as a central solid plug core extruded with binders or sintered together. In an installation, the injector 13 is preferably inserted slightly downstream of the prime mover pump 7 and can be utilized to implement the foregoing modifications of this invention. As in FIGS. 3 and 4, a fiber-liquid network 14b is utilized to transport particulate material 16, the fiber network 14 being charged into the pipe 8a by the injector. The particulate material 16 to be conveyed thereby, possibly together with some liquid, is charged by pump 7 into pipe 8 inlet of the injector 13. The pump can be a slurry-type pump or a piston-type pump such as is used to pump thick aggregate-containing concrete.

Essentially the same step of injecting a fiber-liquid network 14b via the injector 13 can be utilized to provide a supplementary annular barrier layer between the wall of the pipe 8a and a previously constituted core mix of particulate material 16 within a fiber-liquid network 14 as in FIGS. 7 and 8.

The annular cushioning layer 14b can be injected or introduced into the pipeline by other types of injectors, such as those shown in U.S. Pat. No. 3,826,279. The injection action can be supplied by a pump forcing the fiber-water suspension into the injector, or by shaping the injector so as to cause the flow of core material to generate an injection suction that draws the fiber suspension into the pipeline annulus. The entrance end of the forced- or sucked-in inlet need not be tangentially oriented, and the inlet can be directed at right angles to the core conduit or even in line with the core conduit.

A feature of the present invention is the use of supported or cushioned capsules, the external surfaces of which have projecting faces that reduce the tendency of the capsules to settle and contact with the internal wall of the pipeline pipe. FIG. 13 shows such an arrangement in which a pipeline pipe 8 carries a succession of capsules 21 that have generally cylindrical bodies 22 with vanes 23 projecting outwardly a distance of at least about 1 centimeter. Preferably the projection is at least about 2 centimeters and spans at least half the distance between the capsule body and the pipe wall.

The space between the pipe wall and the capsule is essentially filled with fiber-liquid floc suspension 14b and this acts as a cushion to resist the settling of the capsule to the bottom of the pipe when the capsule has a specific gravity greater than that of the suspension. Similarly, the suspension resists the lifting or upward settling of the capsule to the top of the pipe when the capsule has a specific gravity lower than that of the suspension.

The vanes effectively increase the cushioning engagement of the capsule by the fiber floc suspension and thus slow down the settling action whether the settling be downward or upward. It is accordingly practical to diminish the fiber concentration within the fluid suspension without seriously detracting from the stability of the capsule. Fiber reductions of 5% to 15% have been demonstrated with capsules which have bodies from about 0.5 to about 0.95 the internal pipe diameter.

The vanes should be at least about 2 centimeters apart at their bases, inasmuch as closer spacings do not add significantly to their action. Also, the vanes preferably extend lengthwise of their capsule essentially the full length of the capsule, particulrly since the capsules are readily manufactured by extrusion of the body integrated with the vanes.

The capsule, with or without vanes, can be loaded with any desired materials to be transported through the pipeline, particularly those that should not be wetted by the transporting liquid. In addition to those mentioned hereinabove, lap pulp, dry or partially dried fibers for wet-felting or dryfelting to make paper or fiberboard or textiles, grains, ores including sulfur in general, chemicals (both organic and inorganic), plastic granules, commodities such as sugar, bulk items such as portland cement, nails, screws and the like, oils particularly viscous oils, fertilizers, fruits and vegetables, pharmaceuticals and pharmaceutical intermediates, exotic gases such as radon, toxic and other hazardous materials, high purity materials, unstable materials, nuclear wastes and other radioactive materials preferably using lead or lead-lined capsules and/or lead-lined pipeline pipe.

The number of vanes per capsule can be varied, and as few as two vanes are adequate where the capsule is loaded into the pipeline with the vanes properly oriented. Thus, the internal wall of the pipeline at its loading end can have guide rails that orient incoming capsules as they enter. Once in the pipeline and immersed in the fiber-floc slurry, the capsules have little or no tendency to rotate around their longitudinal axis because of the cushioning action of fiber flocs.

Although eight equally spaced vanes are shown in FIG. 13 to guard against capsule rotation, 7, 6, 5 or 4 are almost as effective.

The vanes are also helpful in stabilizing capsules being transported through pipelines without the help of the fiber flocs. Thus, water alone can be the hydraulic capsule-transporting liquid, and particularly where the capsule has a specific gravity close to that of the transporting liquid, e.g. within 10%, the fibers may not be needed where vanes will adequately reduce the tendency of the capsules to bump against the pipe wall at pipe bends and the like.

Where fiber is used, the vanes need not necessarily extend horizontally to provide the extra cushioning of the present invention. FIG. 14 shows such a modification in which a capsule 28 has a body 22 with only two vanes 29, 29, both projecting downwardly from its sides. Fiber flocs in the hydraulic liquid are trapped between these vanes and more effectively inhibit downward capsule settling than horizontally projecting vanes do. Vanes 29 should be directed upwardly when the capsule has a specific gravity smaller than that of the hydraulic liquid.

When the capsules have specific gravities significantly different from that of the transporting liquid, the forces of gravity and buoyancy cause the capsules to take an off-center equilibrium position, being slightly above center when of lower specific gravity, and slightly below center when of higher specific gravity. The same equilibrium applies to cores of particulates or rods that are not confined in capsules.

The cushioning action of the fiber-liquid flocs of the present invention is further improved by connecting adjacent flocs together so that small flocs behave like larger ones. FIG. 15 shows an engagement lattice 32 which effects such a connecting action by merely being dropped into the fiber suspension although some mixing action can be supplied. Lattice 32 is a small piece of screen or gauze or cheesecloth or screening, with cells 34 about 1 to about 20 millimeters wide, preferably about 2 to about 15 millimeters wide. The strands 36 of the lattice are preferably quite thin, less than about 0.3 millimeter thick so as not to add much bulk to the suspension. Similarly, the lattice itself is preferably quite small, but at least one centimeter long and at least one centimeter wide. Lattices larger than about 3 centimeters tend to ball up and are not as effective.

The lattice need not be square, but can be triangular or round or in the form of a tape. The strands can be of cotton, wire, plastic, wool or the like, and even a stranded single cell is effective for the purposes of the present invention. The concentration of the engagement lattice members in the fiber suspension should be quite low. Thus, even a 1% lattice content based on total fiber weight provides a noticeable improvement in cushioning, but about 2% to about 10% lattice content is preferred. The use of the lattice members enables the reduction of the fiber content in the slurry by an amount about 10% to 20% greater than the lattice content. Where the lattice strands cross, there should be sufficient bonding to hold the lattice together.

FIG. 16 shows a lattice in the form of a tuft of wool 40. Such tufts are generally ball-shaped or disc-shaped inter-entangled fiber agglomerate that are securely interlocked.

A still further lattice is shown in FIG. 17 at 48. This is made by collecting a small amount of fibers 49 and then bonding them together as at 51 so that the bonding and associated entanglement holds all the fibers securely. Where the fibers are heat-bondable, it is sufficient to press heated bonding rods together from opposite sides of the fiber mass. Alternately, a drop of hot melt adhesive can be similarly applied and allowed to set.

Waste or used newsprint is a very desirable source of fibers, inasmuch as it is inexpensive and readily available. A simple hydropulper will adequately disintegrate the paper and disperse and flocculate the resulting fibers. Bagasse is another desirable source of fiber for the present invention, being inexpensive and can be hydropulped to give relatively long fibers that provide improved interflocculation. Off-cuts and trimmings or other scrap from paper processing plants are also very effective.

The fibers separated out from the pipeline discharge can be de-watered and used as fuel, or can be used to make cardboard, or can be returned to the pipeline inlet for transporting additional objects. Such return can be effected by truck or with a small return pipeline that also returns capsules for re-use.

In yet a further modified form of the invention an injector or other means can be used to insert a gas layer between the wall of the supporting structure and the fiber-liquid network 14 therein. This is particularly useful with high-fiber concentrations, that is, in excess of 7% mass concentration such as may be required for the transportation of particles having very high specific gravity. Fiber concentrations of up to 30% can be used in this method of transportation. This technique as applied to the pumping of wood pulp alone, is discussed in my paper "High Consistency Flow of Pulp Suspensions in Pipes" published in "Tappi" Vol. 61, No. 8 1978. As there explained the annular gas layer will exist largely as separated gas bubbles that do not significantly penetrate through the concentrated fiber suspension.

To facilitate the use of fiber pulps having fiber concentrations over about 10%, such pulps can be stored in tanks such as shown at 50 in FIG. 18, and dispensed as needed using the pumping combination 52 also shown in that figure.

This pumping combination includes a pulp thickener 54 that can have a tapered screw impeller 56 of generally standard design, but can also have an extra extension blade impeller 58 that projects into the tank at its bottom, at least 5 to 10 centimeters. Around the intake 60 of the thickener are positioned a number of jet openings 62 that are connected to the discharge outlet 64 of a water pump 66. The intake of pump 66 leads to a water container 68 which in turn collects the water squeezed out through the screen 70 of the thickener 54. The thickened pulp outlet 72 of the thickener is connected to the intake of a gear pump 74 that can pump the thick pulp as far as 300 meters with an outlet that is about 50 centimeters in diameter.

When the pulp in tank 50 has a concentration of about 12%, the jets 62 and pump 66 are preferably arranged to inject water under a pressure of about 8 bar so that the jets move at about 20 meters per second. These parameters can be varied, but pump 66 should be capable of an output pressure of about 10 bar. With jet openings about ½ to 2 centimeters wide, they can be spaced about 5 to 20 centimeters apart around the inlet 60.

The diluted pulp in the zone of the thickener intake 60 should be below about 10%.

Some if not all of the water injected into the pulp by the injectors 62, is squeezed out of the diluted pulp as it moves through the thickener 54, and escapes through the screen 70. This water is collected in tank 68 and returned to pump 66 for recycling.

The thickened pulp delivered to the gear pump 74 can accordingly have the same, or higher or lower, fiber concentrations as that of the pulp in tank 50. In addition, the thickener does a good job of de-aerating the pulp that it squeezes out of its discharge outlet, so that the gear pump operates more smoothly.

It will be appreciated that various alterations or modifications may be made to the foregoing without departing from the spirit or scope of this invention. By suitably choosing the fiber/particle admixture as well as the particular flow rate, the friction loss within a pipeline may be less than that of pumping water alone within that pipeline. Further, it will be appreciated that in some cases, pumping will not be necessary, gravitational forces being utilized as a prime mover means, for example, with a pipeline or open duct extending downhill.

I claim:

1. A body of liquid in which is suspended interlinked fiber flocs that support solids introduced into the liquid body, the interlinking being effected by a quantity of engagement lattice having securely interlocked strands with cells between about 1 and about 20 millimeters wide that inter-engage with the fibers of the fiber flocs and increase their solid-supporting effectiveness.

2. The method of hydraulically transporting solids in a pipeline, in which method the transporting liquid reduces the engagement of the solids with the pipeline pipe, and there is suspended in the liquid a quantity of interlinked fiber flocs that improves the engagement reduction, the fiber flocs being interlinked by engagement lattices that have securely interlocked strands with cells between about 1 and about 20 millimeters wide which inter-engage with the fibers of the flocs.

* * * * *